(12) United States Patent
Streelman

(10) Patent No.: US 7,530,494 B1
(45) Date of Patent: May 12, 2009

(54) MULTI-FUNCTIONAL SCANNER FOR READING BARCODES

(76) Inventor: Steven M. Streelman, 1755 Tamarack Ave., Carlsbad, CA (US) 92008

( * ) Notice: Subject to any disclaimer, the term of this patent is extended or adjusted under 35 U.S.C. 154(b) by 391 days.

(21) Appl. No.: 11/293,668

(22) Filed: Dec. 5, 2005

(51) Int. Cl.
*G06F 7/00* (2006.01)
*G06F 19/00* (2006.01)
*G06Q 30/00* (2006.01)
*G06Q 90/00* (2006.01)
*G06K 7/10* (2006.01)
*G06Q 10/00* (2006.01)

(52) U.S. Cl. .................. 235/381; 235/385; 235/462.01; 235/454; 705/28

(58) Field of Classification Search ................ 235/381, 235/385, 454, 462.01; 705/28, 1, 26
See application file for complete search history.

(56) References Cited

U.S. PATENT DOCUMENTS

| | | | |
|---|---|---|---|
| 5,327,554 A | 7/1994 | Palazzi, III et al. | |
| 5,684,288 A * | 11/1997 | Renvall ................. | 235/462.15 |
| 5,887,062 A | 3/1999 | Maeda et al. | |
| 5,905,521 A * | 5/1999 | Gatto et al. ................... | 725/95 |
| 5,992,746 A * | 11/1999 | Suzuki ................... | 235/462.21 |
| 6,012,102 A * | 1/2000 | Shachar ........................ | 710/5 |
| 6,046,721 A | 4/2000 | Song et al. | |
| 6,307,649 B1 | 10/2001 | Williamson | |
| 6,311,268 B1 * | 10/2001 | Chu .............................. | 713/1 |
| 6,356,923 B1 * | 3/2002 | Yano et al. .................. | 717/127 |
| 6,360,951 B1 * | 3/2002 | Swinehart .............. | 235/472.01 |
| D471,169 S | 3/2003 | Izu et al. | |
| 6,622,919 B1 * | 9/2003 | Wilz et al. ............. | 235/472.01 |
| 6,629,635 B1 * | 10/2003 | Akamine .................... | 235/375 |
| 6,757,663 B1 * | 6/2004 | Rogers et al. ................. | 705/24 |
| 6,791,588 B1 * | 9/2004 | Philyaw ..................... | 715/862 |
| 6,886,748 B1 * | 5/2005 | Moore ........................ | 235/435 |
| 6,965,866 B2 * | 11/2005 | Klein .............................. | 705/1 |
| 7,055,737 B1 * | 6/2006 | Tobin et al. .................. | 235/375 |
| 7,070,103 B2 * | 7/2006 | Melick et al. ........... | 235/462.01 |
| 7,127,261 B2 * | 10/2006 | Van Erlach .............. | 455/456.5 |
| 7,346,917 B2 * | 3/2008 | Gatto et al. ..................... | 725/5 |
| 7,357,323 B2 * | 4/2008 | Silverbrook et al. ... | 235/462.01 |
| 7,363,580 B2 * | 4/2008 | Tabata et al. ................. | 715/234 |
| 2001/0011276 A1 * | 8/2001 | Durst, Jr. et al. .............. | 707/10 |
| 2001/0025245 A1 * | 9/2001 | Flickinger et al. ............... | 705/1 |
| 2001/0027401 A1 * | 10/2001 | Klein ............................. | 705/1 |
| 2001/0029470 A1 * | 10/2001 | Schultz et al. ................ | 705/26 |
| 2001/0034609 A1 * | 10/2001 | Dovolis ......................... | 705/1 |
| 2001/0037248 A1 * | 11/2001 | Klein .......................... | 705/22 |
| 2001/0042022 A1 * | 11/2001 | Kirkpatrick et al. ........... | 705/26 |
| 2001/0054008 A1 * | 12/2001 | Miller et al. .................. | 705/26 |
| 2001/0056359 A1 * | 12/2001 | Abreu .......................... | 705/3 |
| 2002/0002496 A1 * | 1/2002 | Miller et al. .................. | 705/26 |

(Continued)

*Primary Examiner*—Daniel Walsh

(57) ABSTRACT

A device is provided for recognizing individual bar codes from selected household items and registering bar code data at a central monitoring station via a web browser on the Internet. The device includes a control module directly connected to a television and includes an optical recognition mechanism for scanning a barcode label. The optical recognition mechanism converts bar code data into a stream of convertible analog data to be transferred over the Internet using a standard web browser and 128-bit SSL technology for added security. A communication mechanism is operably connected to the optical recognition mechanism and cooperates therewith during operating conditions. A data interface circuit is directly coupled to the communication link so that the microprocessor can directly format and transfer bar code data in HTML format prior to being sent to the central monitoring station database.

8 Claims, 3 Drawing Sheets

U.S. PATENT DOCUMENTS

| | | | |
|---|---|---|---|
| 2002/0007307 A1* | 1/2002 | Miller et al. | 705/14 |
| 2002/0023012 A1* | 2/2002 | Usui | 705/26 |
| 2002/0026358 A1* | 2/2002 | Miller et al. | 705/14 |
| 2002/0026369 A1* | 2/2002 | Miller et al. | 705/26 |
| 2002/0088001 A1* | 7/2002 | Zustak et al. | 725/109 |
| 2002/0133425 A1* | 9/2002 | Pederson et al. | 705/26 |
| 2002/0195495 A1* | 12/2002 | Melick et al. | 235/462.01 |
| 2003/0014267 A1* | 1/2003 | Culp | 705/1 |
| 2003/0034399 A1* | 2/2003 | Wilz et al. | 235/462.45 |
| 2003/0093384 A1* | 5/2003 | Durst et al. | 705/64 |
| 2003/0111531 A1* | 6/2003 | Williams | 235/383 |
| 2004/0030599 A1* | 2/2004 | Sie et al. | 705/14 |
| 2004/0081020 A1* | 4/2004 | Blosser et al. | 367/96 |
| 2004/0172260 A1* | 9/2004 | Junger et al. | 705/1 |
| 2005/0035207 A1* | 2/2005 | Philyaw et al. | 235/462.42 |
| 2005/0224571 A1* | 10/2005 | Kelley et al. | 235/375 |
| 2005/0246237 A1* | 11/2005 | Hudetz et al. | 705/26 |
| 2005/0258250 A1* | 11/2005 | Melick et al. | 235/462.46 |
| 2006/0124742 A1* | 6/2006 | Rines et al. | 235/462.01 |

* cited by examiner

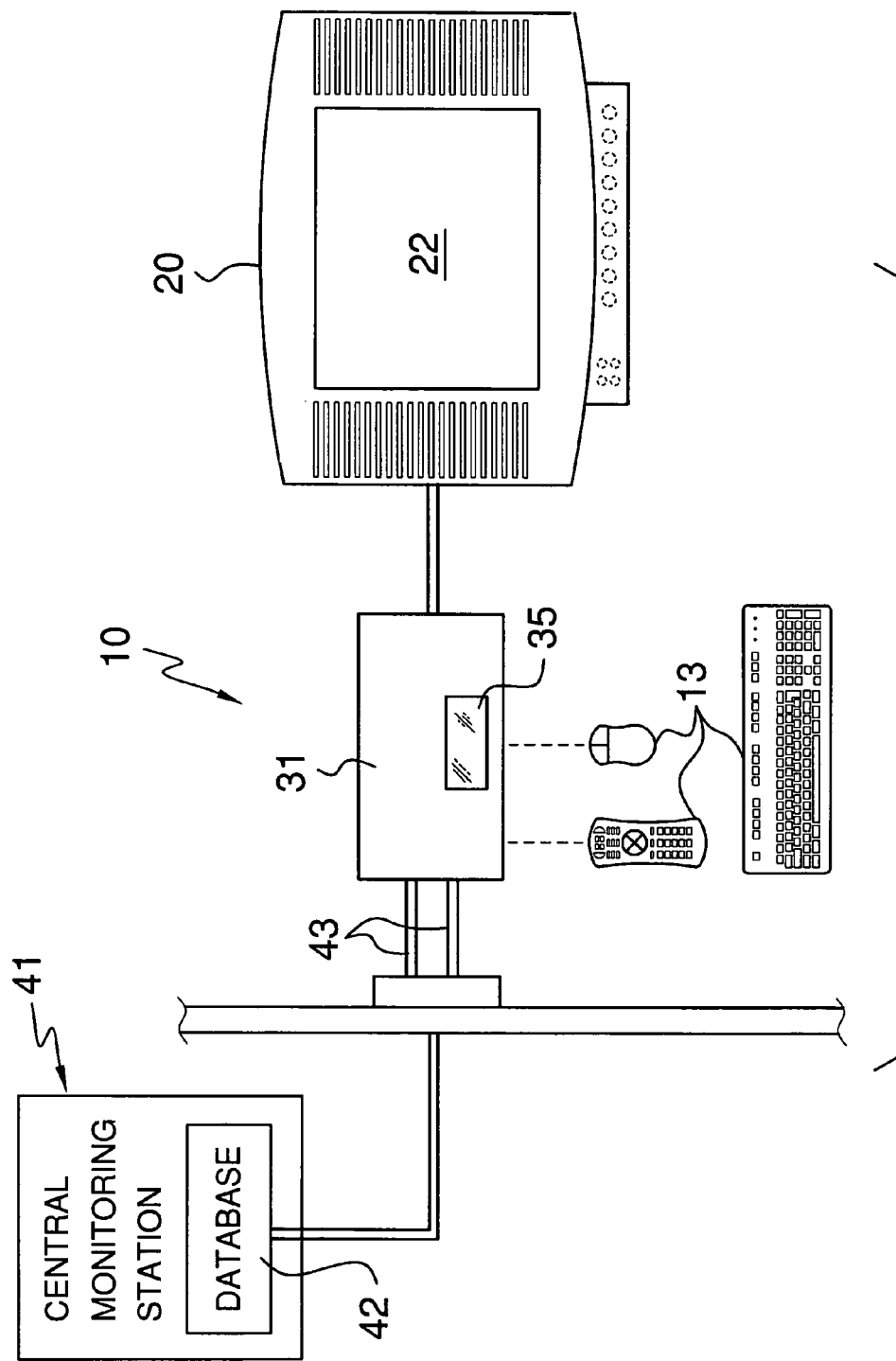

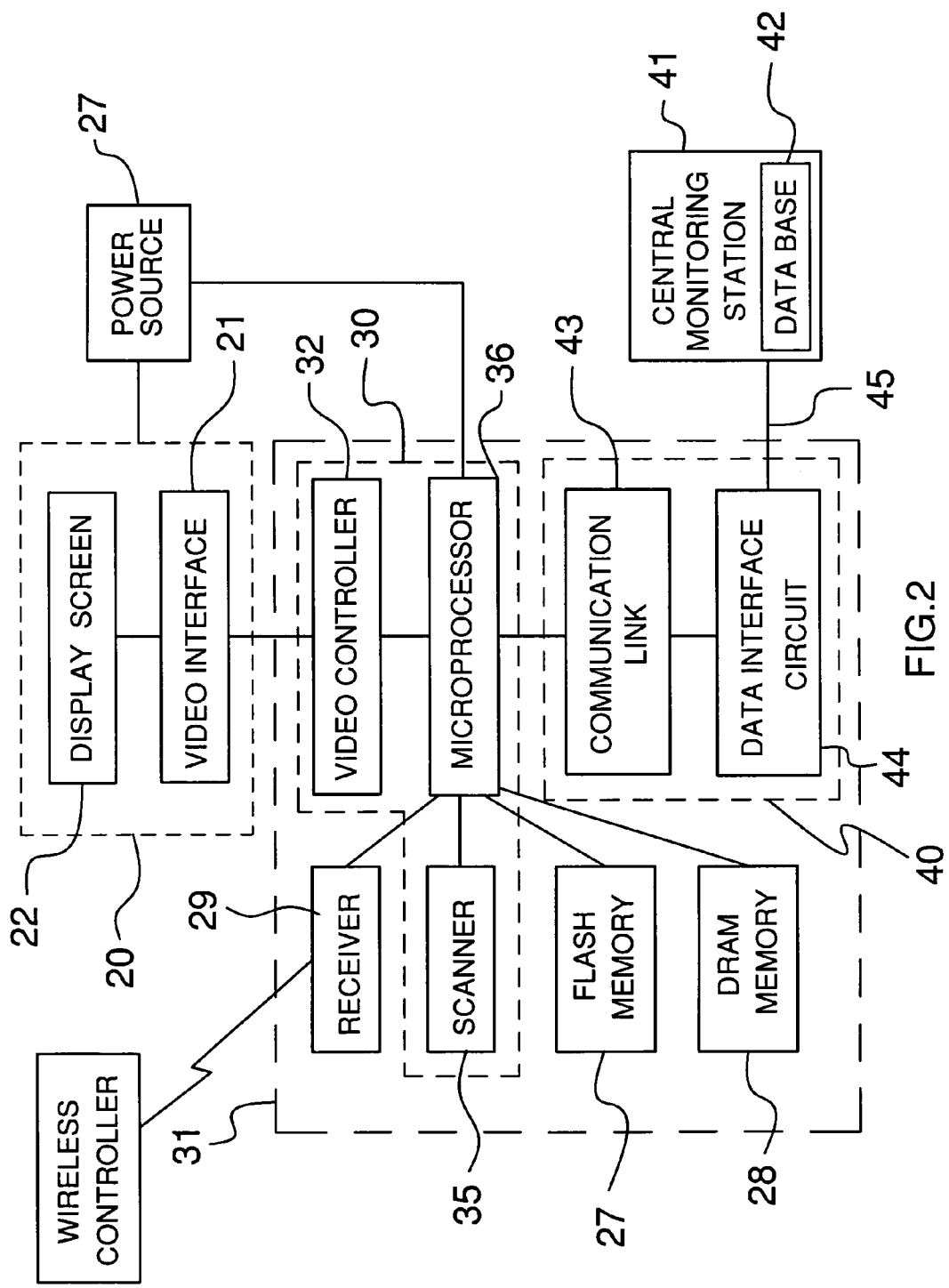

MULTI-FUNCTIONAL SCANNER FOR READING BARCODES

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a multi-functional scanner and, more particularly, to a multi-functional scanner capable of reading barcodes for scanning product information and registering the product information and associated user information via a web browser over the Internet.

2. Prior Art

In recent years, there has been a marked surge in the popularity of numerous commercial database systems, such as data retrieval services. These database services provide various information and popular services that may be sought by the public-at-large, such as travel information, news retrieval, or stock quotation indices. The computerized databases are designed to be accessed by end-users from the home or office.

In a typical database system, the desired information is accumulated at a host computer system or network, in which the information is stored in databases or files that may be accessed by the end-user. In order to access this information or to use the services provided by the host computer network, a retrieval terminal or some other means to access information from the remote host database is required by the end-user.

Systems have been previously developed for accessing computerized databases through a telephone communication network by an apparatus that implements telephone functions and displays the requested data on a display monitor. One example discloses a system for displaying information retrieved over a telephone network on a terminal apparatus. Another example similarly proposes a system for providing interactive communication with a remote database over a telephone exchange, which utilizes a television receiver to display the data retrieved.

However, the above-mentioned systems suffer a number of drawbacks. All of these systems require an additional peripheral device (and its associated cost) in order to utilize and control the operation of the device. The prior systems that utilize the telephone keypad as a control means do so only to establish connection to a remote database. Consequently, the necessary addition of a peripheral keyboard or keypad to control the terminals inevitably increases the expense of these known systems.

Furthermore, in several of the prior systems, the display device that is utilized does not comprise a readily available component (for example, a conventional television receiver) but rather entails a modified or specifically equipped display device. The use of such a specialized display device inevitably increases the cost of the overall system to the consumer/user.

An additional drawback of the previously-known systems is that they lack a reprogrammable memory capability. A system without such a feature possesses significant limitations. For example, any required future enhancements, repairs or modifications to the units must be serviced by field personnel, or recalled from the consumer marketplace back to the manufacturer for such changes. Such a costly servicing of the prior systems could have been avoided, in many cases, if a reprogrammable memory capability had been available which would allow modifications to be easily implemented from a remote location. Thus, the lack of programmable memory leaves the systems wanting in expansibility due to their inflexibility.

Accordingly, a need remains for a multi-functional scanner for reading barcodes in order to overcome the above-noted shortcomings. The present invention satisfies such a need by providing a scanner that includes a UPC scanner, microprocessor, and telecommunications modem, that provides the hardware resources needed for on-line communications purposes. The device is especially practical to implement with High-Definition Televisions (HDTV's) or other high-end televisions, which are becoming increasingly more complex not only in terms of their internal circuitry but also their user control options. In addition to providing customer assistance with its operation, the device also provides an on-line diagnostic capability in the event of equipment hardware malfunction, thus making the device user friendly.

BRIEF SUMMARY OF THE INVENTION

In view of the foregoing background, it is therefore an object of the present invention to provide a multi-functional scanner for reading barcodes. These and other objects, features, and advantages of the invention are provided by a device for scanning product information and registering the product information and associated user information by using a web browser and the Internet.

The invention relates to a scanner or bar decoder that would be located outside a television set for the purpose of recognizing individual bar codes from selected household items. The apparatus would comprise the scanner and all the means to be integrated into the television set as well as time and date of purchase. Additionally, at the approval of the purchaser, manufacturers would be provided with this information for marketing purposes. In this fashion, their advertising could be more directly focused to the individual consumer. Eventually, the need for paper manuals and registration cards would be obsolete with the employment of the present invention.

An interactive guide for troubleshooting and product manual questions could be provided after registration and warranty information is obtained and would be displayed on the screen. This gives the owner an easy to find method of organizing everything in the household for quick reference. In the event of the need for troubleshooting the product, a series of questions would be presented (where available and applicable) and the owner would be offered a step by step solution. For more expensive items, the individual could be presented with the option of having the company contact them for assistance. In this case, the unit would need to be connected to a phone line or other conventional communications link. Ideally, this would be with your higher end products where there is a high premium on service expected. For example, a new Mercedes Benz owner would be able to access his or her previously scanned car information. The screen would display any need for maintenance requests and would have the aforementioned "I want someone to call me about my car"

button, for example. This eliminates finding phone numbers and automated networks that are very frustrating to the high end consumer.

Another model or use for the present invention is to assist in product recalls. If a particular product has a recall, the consumer could be easily identified and informed of the recall and all the necessary information regarding that consumer's recall on their product can be provided immediately. The manufacturer would have access to all consumers that have their product and are then able to contact them.

In an alternate embodiment, the present invention provides detailed information of home assets provided to insurance companies. In the event of fire, theft or any home disaster involving loss property, the insurance company could make use of the present invention data base to gain information on loss of assets for that particular consumer. In this fashion, the insurance company would be able to generate a very detailed list of assets that were involved in the disaster, minimizing fraudulent claims.

For less expensive items, like a $29 brand X coffee maker, the present invention may provide a mechanism to register the product with warranty information. As mentioned previously, the customer may notify third parties that he/she has a brand X coffee maker and thereby provide direct marketing techniques to the producer of brand X coffee makers. If the consumer desires not to have this information known, then the present invention can limit the availability of the registered product information. This information could be accessed at any time. If third parties are allowed access, the consumer could be sent updates or advertising that directly relates to their product.

The present invention provides an easy way to register any product using that products bar code or a new bar code that will be included with the product, displays all the information on the screen, and offers various user options according to what both the consumer and manufacturer would desire. This allows both parties quick and easy access to all the specifications of that product as well as options for both parties to manage the products. Products with this technology could advertise on the outside of their boxes that their product is compatible with the present invention's mechanism and, therefore, enticing the consumer to easily register warranty and registration information. No more registration cards to fill out or help lines to call. In summary, the advantages of the present invention allow consumers and manufacturers to:

1.) Do away with user manuals, registration and warranty cards.
2.) Allow direct access to troubleshooting info, warranty information, business info and product.
3.) Allow the manufacturers to send current updates and inform/identify consumers of product recalls.
4.) Provide direct advertising to the consumer by description and brand of past products purchased.
5.) Enhance customer service.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a schematic diagram showing the interrelationship between the essential elements of the present invention;

FIG. 2 is a schematic block diagram showing the primary components of the central monitoring station, control module and television, shown in FIG. 1.

DETAILED DESCRIPTION OF THE INVENTION

Figure 4:
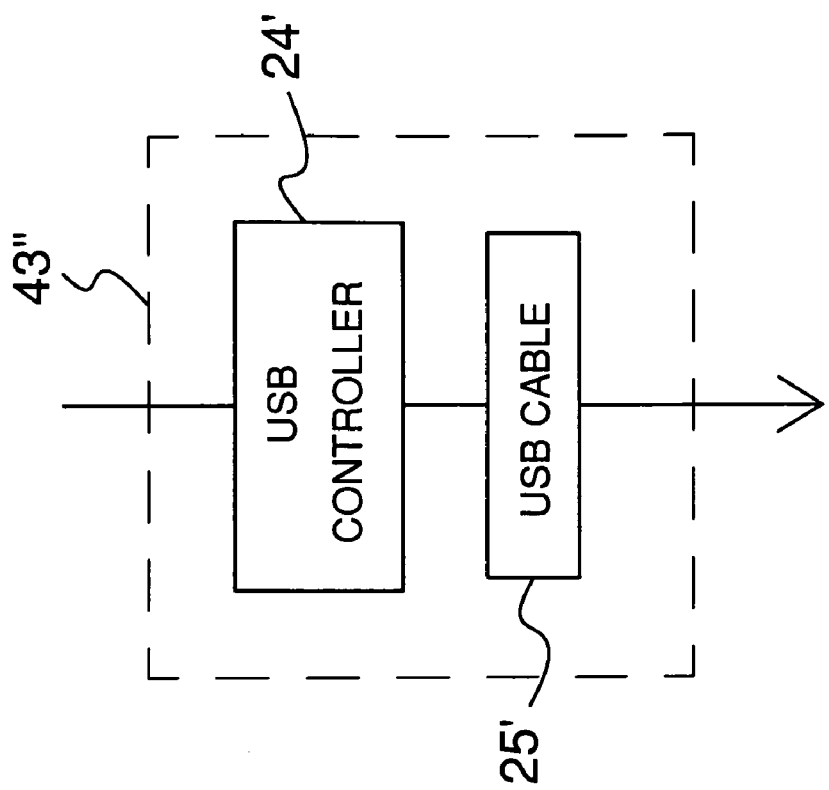
FIGS. 3 and 4 are schematic block diagrams showing alternate embodiments of the communications link shown in FIG. 2.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures. Prime and double notations refer to alternate embodiments of like elements.

The device of this invention is referred to generally in FIGS. 1-4 by the reference numeral 10 and is intended to provide a multi-functional scanner for reading barcodes. It should be understood that the device 10 may be used to scan many different types of barcodes and should not be limited in use to only scanning household items.

Referring initially to FIGS. 1 and 2, a television 20 is connected to a control module 31. The television 20 includes a video interface 21 and a display screen 22 electrically mated thereto for displaying graphical images and alphanumerical values thereon. Of course, any suitably equipped television 20, as is obvious to a person of ordinary skill in the art, may be employed by the present invention. The television 20 is conveniently mated to an external power supply source 27.

A central monitoring station 41 is remotely located from the television 20 wherein the central monitoring station 41 is accessible over the Internet via a web browser. Central monitoring station 41 includes a database 42 housed on an enterprise server, which stores product and user information.

The control module 31 is directly connected to the television 20. The control module 31 includes an optical recognition mechanism 30 for scanning a barcode label (not shown). The optical recognition mechanism 30 includes a video controller 32 directly connected to the video interface 21 such that scanned information can be displayed and verified on the display screen 22 during operating conditions. The optical recognition mechanism converts bar code data into a stream of analog data to be transferred over the Internet using a standard web browser and 128-bit secure socket layer (SSL) technology for added security. A mechanism 40 for communicating with the central monitoring station 41 is provided such that the product and user information can be uploaded in real time to the database 42 monitored by the central monitoring station 41. The communication mechanism 40 is operably connected to the optical recognition mechanism 30 and cooperates therewith during operating conditions, thus advantageously allowing information in the form of electrical data to be communicated to a user.

Referring to FIG. 2 in more detail, the optical recognition mechanism 31 further includes a scanner 35 and a microprocessor 36 electrically coupled thereto. Such a scanner 35 generates and sends a signal to the microprocessor 36 for instructing the microprocessor 36 to execute a control algorithm and determine whether the scanned information should be displayed on the display screen 22 or transmitted to the communications link 40 for convenient registration with the central monitoring station 41. This feature advantageously eliminates the time and energy consuming procedure where a consumer needs to register their newly purchased product, for warranty purposes, via mail or telephone registration systems.

Figure 3:
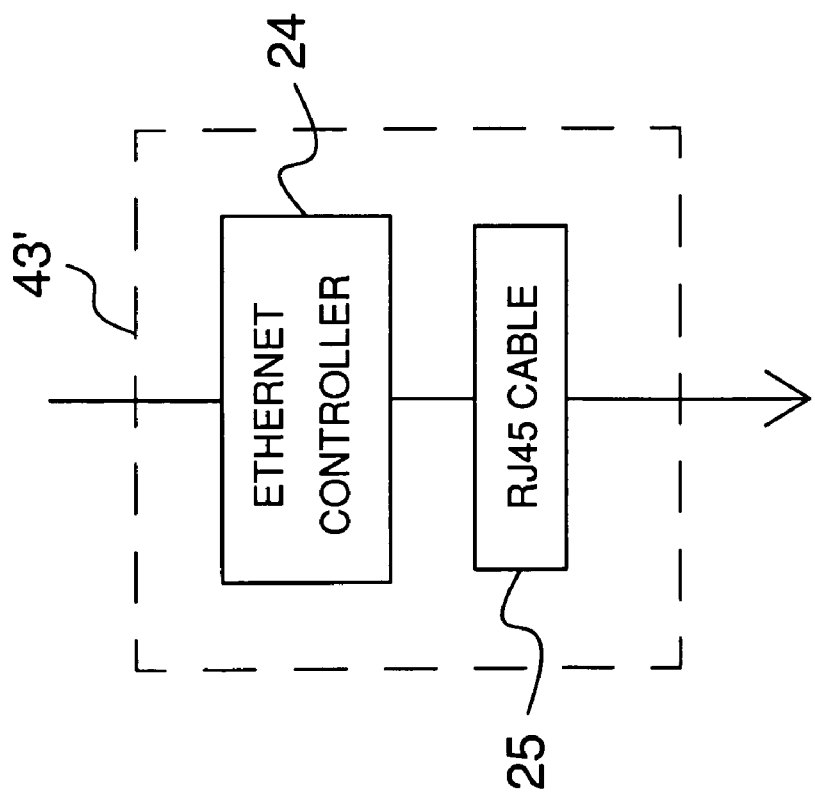

Now referring to FIG. 3, in a preferred embodiment, the communication link 43 includes an Ethernet controller 24 and an Ethernet cable 25 electrically mated thereto. The Ethernet controller 24 is operably and directly connected to the optical recognition mechanism 30 for receiving the signal from the microprocessor 36. A data interface circuit 44 is directly coupled to the communication link 43 so that the microprocessor 36 can directly format and transfer bar code data in HTML format to the central monitoring station database 42.

Referring to FIG. 4, in an alternate embodiment, the communication link 43 includes a USB controller 24 and a USB cable 25 electrically mated thereto. The USB controller 24 is operably and directly connected to the optical recognition mechanism 30 for receiving the signal from the microprocessor 36.

In yet another embodiment, a telephony cable 45 (not shown) is removably connectable to the phone jack 44 and a phone outlet (not shown) so that the module 30 can advantageously directly transfer data to the service provider database 42. Advantageous and critical feature for reducing the amount of hardware required, thereby reducing the cost of the device 10.

The control module 31 further includes at least one memory card 27 (flash memory), 28 (DRAM memory) removably attachable to the microprocessor 36 for downloading the product and user information thereon. The memory card 27, 28 can be interfaced with a PC for storing the product and user information on a secondary database remotely located from the central monitoring station database 42.

The present invention further includes at least one wireless controller 13 such as a mouse, remote control and keyboard having preprogrammed functions for allowing the user to wirelessly transmit input signals to the control module 31. A receiver 29 is housed within the control module 31 for receiving the input signals transmitted from the wireless controller 13 based upon a user input.

There may be applications of the device 10 beyond those described herein above. In addition to warranty information, the manufacturers of a product may be provided with the time and date of the purchase. Thus, at the approval of the purchaser, manufacturers can use the information for marketing purposes that advantageously allow for more effective and targeted marketing practices. The device 10 further allows for the eventual elimination of paper manuals and registrations cards, making such items obsolete.

An interactive guide for trouble shooting and product manual questions can be displayed on the display screen 22.

In the event of the need for troubleshooting the product, a series of questions can be presented and a step-by-step solution, with detailed figures where needed, can be offered. For more expensive items, the individual is presented with the option of having the company contact them for assistance. This conveniently eliminates the need to find phone numbers and deal with automated networks that tend to frustrate the consumer.

Another possible application of the device 10 is to assist manufacturers in product recalls. If a particular product must be recalled, the consumers are easily identified and informed of the recall, and provided all the necessary information through the device 10.

Insurance companies can use the device 10 in the event of a fire where property is damaged or lost. In such a use, the device 10 database 42 would be accessed to gain information on the loss of registered assets. This advantageously allows an insurance company to construct a very detailed list of assets that were lost, thus minimizing costly fraudulent claims.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A device for scanning product information and registering the product information and associated user information via the Internet, said device comprising:

a television including a video interface and a display screen electrically mated thereto for displaying graphical images and alphanumerical values thereon;

a central monitoring station remotely located from said television, a service provider being accessible over the Internet via a web browser and including a database housing product and user information, wherein said information includes at least a product manual and interactive product guide;

a control module directly connected to said television, said control module comprising optical recognition means for scanning a barcode label, said optical recognition means including a video controller directly connected to said video interface such that scanned information can be displayed and verified on said display screen during operating conditions, said optical recognition means converting bar code data into a stream of analog data, and means for communicating with said service provider such that the product and user information can be uploaded in real time to said database monitored by said central monitoring station via the Internet, wherein said communication means is operably connected to said optical recognition means and cooperates therewith during operating conditions; wherein said optical recognition means comprises a scanner and a microprocessor electrically coupled thereto, said scanner generating and sending a signal to said microprocessor for instructing said microprocessor to execute a control algorithm and determine whether the scanned information should be displayed on said display screen or transmitted to said communicating means for registration with said central monitoring station; and wherein said control module further comprises: at least one memory card removably attachable to said microprocessor for downloading the product and user information thereon, said memory card being interfaced with a PC for storing the product and user information on a secondary database remotely located from said central monitoring station database.

2. The device of claim 1, wherein said communication means comprises:
- an Ethernet controller and an Ethernet cable electrically mated thereto, said Ethernet controller being operably and directly connected to said optical recognition means for receiving said signal from said microprocessor; and
- a data interface circuit directly coupled to said communication link so that said microprocessor can directly format and transfer data in HTML format to said central monitoring station database.

3. The device of claim 1, further comprising:
- at least one wireless controller having preprogrammed functions for allowing the user to wirelessly transmit input signals to said control module; and
- a receiver housed within said control module for receiving said input signals transmitted from said wireless controller based upon a user input.

4. The device of claim 1, wherein said at least one memory card is selected from the group including: flash memory and DRAM memory.

5. A device for scanning product information and registering the product information and associated user information via the Internet, said device comprising:
- a television including a video interface and a display screen electrically mated thereto for displaying graphical images and alphanumerical values thereon;
- a central monitoring station remotely located from said television, said service provider being accessible over the Internet via a web browser and including a database housing product and user information, said product and user information including
  - a product warranty information,
  - a product purchase date,
  - a product manual and an interactive product guide,
  - a product registration card,
  - a product recall list, and
  - a list of registered assets covered under an insurance policy;
- a control module directly connected to said television, said control module comprising
  - optical recognition means for scanning a barcode label, said optical recognition means including a video controller directly connected to said video interface such that scanned information can be displayed and verified on said display screen during operating conditions, said optical recognition means converting bar code data into a stream of analog data, and
  - means for communicating with a service provider such that the product and user information can be uploaded in real time to said database monitored by said central monitoring station via the Internet,
  - wherein said communication means is operably connected to said optical recognition means and cooperates therewith during operating conditions; and wherein said optical recognition means comprises: a scanner and a microprocessor electrically coupled thereto, said scanner generating and sending a signal to said microprocessor for instructing said microprocessor to execute a control algorithm and determine whether the scanned information should be displayed on said display screen or transmitted to said communicating means for registration with said central monitoring station.

6. The device of claim 5, wherein said communication means comprises:
- an Ethernet controller and an Ethernet cable electrically mated thereto, said Ethernet controller being operably and directly connected to said optical recognition means for receiving said signal from said microprocessor; and
- a data interface circuit directly coupled to said communication link so that said microprocessor can directly format and transfer data in HTML format to said central monitoring station database.

7. The device of claim 6, wherein said control module further comprises: at least one memory card removably attachable to said microprocessor for downloading the product and user information thereon, said memory card being interfaced with a PC for storing the product and user information on a secondary database remotely located from said central monitoring station database.

8. The device of claim 7, further comprising:
- at least one wireless controller having preprogrammed functions for allowing the user to wirelessly transmit input signals to said control module; and
- a receiver housed within said control module for receiving said input signals transmitted from said wireless controller based upon a user input.

* * * * *